United States Patent
Nakaishi et al.

(10) Patent No.: US 11,108,057 B2
(45) Date of Patent: Aug. 31, 2021

(54) BIPOLAR PLATE, CELL STACK, AND REDOX FLOW BATTERY

(71) Applicant: SUMITOMO ELECTRIC INDUSTRIES LTD., Osaka (JP)

(72) Inventors: Hiroyuki Nakaishi, Osaka (JP); Kei Hanafusa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 320 days.

(21) Appl. No.: 16/467,659

(22) PCT Filed: Jun. 21, 2017

(86) PCT No.: PCT/JP2017/022929
§ 371 (c)(1),
(2) Date: Jun. 7, 2019

(87) PCT Pub. No.: WO2018/105155
PCT Pub. Date: Jun. 14, 2018

(65) Prior Publication Data
US 2020/0067107 A1    Feb. 27, 2020

(30) Foreign Application Priority Data

Dec. 7, 2016   (JP) .............................. JP2016-238041

(51) Int. Cl.
*H01M 8/0258*    (2016.01)
*H01M 8/04186*   (2016.01)
*H01M 8/18*      (2006.01)

(52) U.S. Cl.
CPC ..... *H01M 8/0258* (2013.01); *H01M 8/04186* (2013.01); *H01M 8/188* (2013.01)

(58) Field of Classification Search
CPC combination set(s) only.
See application file for complete search history.

(56) References Cited

U.S. PATENT DOCUMENTS 3,764,391 A * 10/1973 Warszawski ............ H01M 4/86
429/468
4,151,061 A * 4/1979 Ishikawa ................... C25C 3/08
204/247

(Continued)

FOREIGN PATENT DOCUMENTS

JP    2015-122230 A    7/2015

*Primary Examiner* — Kaity V Chandler
(74) *Attorney, Agent, or Firm* — Baker Botts L.L.P.; Michael A. Sartori

(57) ABSTRACT

A bipolar plate arranged to face an electrode along which electrolyte is circulated, the bipolar plate includes a flow passage that is provided on at least one of front and back surfaces of the bipolar plate and along which the electrolyte is circulated. The flow passage provided on the at least one of the front and back surfaces of the bipolar plate includes an introduction path along which the electrolyte is introduced and a discharge path that does not communicate with and is independent of the introduction path and along which the electrolyte is discharged. At least one of the introduction path and the discharge path includes an inclined groove that non-orthogonally intersects a long side and a short side of an imaginary rectangle that includes an outer edge of the bipolar plate.

22 Claims, 6 Drawing Sheets

20:21, 22
21:210, 212, 214
22:220, 222, 224

(56) References Cited

U.S. PATENT DOCUMENTS

| | | | | |
|---|---|---|---|---|
| 4,631,239 | A | * | 12/1986 | Spurrier .............. H01M 8/0228 |
| | | | | 429/514 |
| 4,853,301 | A | * | 8/1989 | Granata, Jr. ........ H01M 8/0263 |
| | | | | 429/514 |
| 9,166,243 | B2 | * | 10/2015 | Perry ...................... H01M 8/20 |
| 9,972,850 | B2 | * | 5/2018 | O'Neill ............... H01M 8/0271 |
| 2018/0205067 | A1 | * | 7/2018 | Markiewicz ........ H01M 8/0234 |
| 2019/0131633 | A1 | * | 5/2019 | Ishida ................. H01M 8/0276 |
| 2020/0067107 | A1 | * | 2/2020 | Nakaishi ............. H01M 8/0258 |

* cited by examiner

US 11,108,057 B2

BIPOLAR PLATE, CELL STACK, AND REDOX FLOW BATTERY

TECHNICAL FIELD

The present invention relates to a bipolar plate, a cell stack, and a redox flow battery. The present application claims priority based on "Japanese Patent Application No. 2016-238041" filed on Dec. 7, 2016, the entire contents of which are incorporated herein by reference.

BACKGROUND ART

A redox flow battery (hereinafter may be referred to as an RF battery) described in PTL 1 is an example of a large-capacity storage battery. The main component of the RF battery is a battery cell including a positive electrode to which positive electrolyte is supplied, a negative electrode to which negative electrolyte is supplied, and a membrane interposed between the positive and negative electrodes. The positive and negative electrolytes are supplied to the positive and negative electrodes to charge and discharge the battery (see FIG. 18 of PTL 1). A single battery cell includes a pair of bipolar plates arranged to sandwich a multilayer body including the positive and negative electrodes provided on the front and back sides of the membrane (see FIG. 19 in PTL 1). A multi-cell battery, which includes a plurality of battery cells that are stacked together, has a structure called a cell stack (FIG. 19 of PTL 1) in which a single bipolar plate has a positive electrode and a negative electrode placed on the front and back sides thereof.

According to PTL 1, electrolyte flow passages which each include a plurality of groove portions are provided on the front and back surfaces of a square bipolar plate. Among the four sides that define the peripheral edge of the bipolar plate, the bottom side is defined as a supply edge at which electrolyte is supplied and the top side, which opposes the bottom side, is defined as a discharge edge at which the electrolyte is discharged. The bipolar plate disclosed in PTL 1 has an electrolyte flow passage on each surface thereof, the electrolyte flow passage including horizontal grooves that are parallel to the supply edge, a plurality of vertical grooves that extend from the horizontal grooves in a direction orthogonal to the horizontal grooves and that are arranged parallel to each other, and short vertical grooves that extend from the horizontal grooves and open at the supply edge or the discharge edge of the bipolar plate (FIG. 1 in PTL 1).

CITATION LIST

Patent Literature

PTL 1: Japanese Unexamined Patent Application Publication No. 2015-122230

SUMMARY OF INVENTION

A bipolar plate according to the present disclosure is arranged to face an electrode along which electrolyte is circulated, and includes a flow passage that is provided on at least one of front and back surfaces of the bipolar plate and along which the electrolyte is circulated. The flow passage provided on the at least one of the front and back surfaces of the bipolar plate includes an introduction path along which the electrolyte is introduced and a discharge path that does not communicate with and is independent of the introduction path and along which the electrolyte is discharged. At least one of the introduction path and the discharge path includes an inclined groove that non-orthogonally intersects a long side and a short side of an imaginary rectangle that includes an outer edge of the bipolar plate.

Another bipolar plate according to the present disclosure is arranged to face an electrode along which electrolyte is circulated, and includes a flow passage that is provided on each of front and back surfaces of the bipolar plate and along which the electrolyte is circulated. The flow passage provided on at least one of the front and back surfaces of the bipolar plate includes an introduction path along which the electrolyte is introduced and a discharge path that does not communicate with and is independent of the introduction path and along which the electrolyte is discharged. At least one of the introduction path and the discharge path includes an inclined groove that non-orthogonally intersects a long side and a short side of an imaginary rectangle that includes an outer edge of the bipolar plate. The bipolar plate includes a pair of grooves arranged to intersect in a see-through plan view of the front and back surfaces of the bipolar plate, the pair of grooves including the inclined groove provided on one surface of the bipolar plate and a groove that forms the flow passage on another surface of the bipolar plate.

A cell stack according to the present disclosure includes the above-described bipolar plate according to the present disclosure.

A redox flow battery according to the present disclosure includes the above-described cell stack according to the present disclosure.

DESCRIPTION OF EMBODIMENTS

Figure 1:
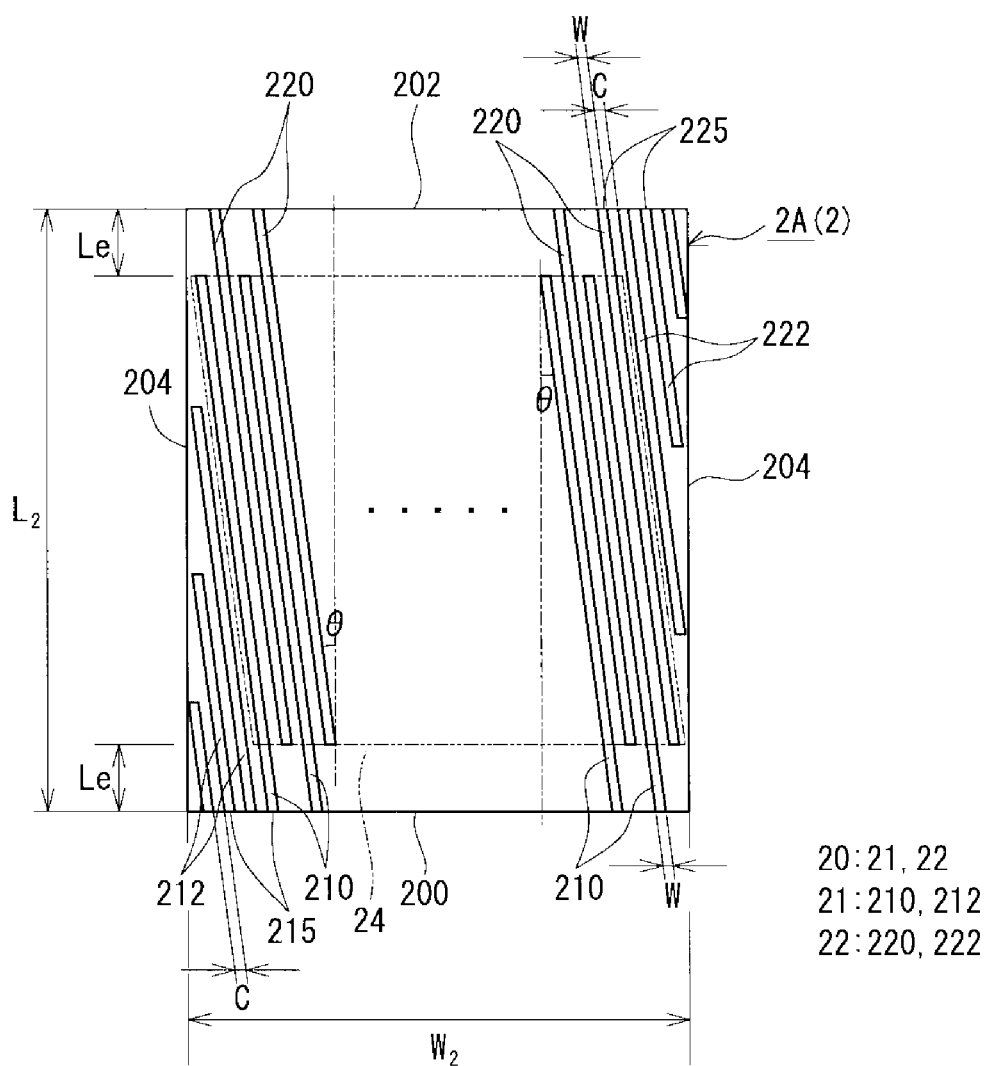
FIG. 1 is a schematic plan view of a bipolar plate according to a first embodiment.

Problems to be Solved by Present Disclosure

Redox flow batteries with an increased electrode utilization rate are desired.

The above-described horizontal and vertical grooves have a predetermined length that is shorter than the length of each side of the bipolar plate, and the short vertical grooves are additionally provided. Thus, the vertical and horizontal grooves are separated from the peripheral edge of the bipolar plate. The bipolar plate has no groove portions at and near the corners thereof. When, for example, a square electrode is placed on the bipolar plate, electrolyte cannot be easily supplied to the regions at and near the corners of the electrode through the flow passage of the bipolar plate. Accordingly, it is conceivable that a battery reaction does not occur in the regions at and near the corners of the electrode and that the electrolyte cannot be easily discharged from the regions at and near the corners of the electrode through the flow passage. In other words, the electrode may have regions that are not effectively utilized (regions at and near the corners in the above-described case).

Accordingly, an object is to provide a bipolar plate with which an electrode utilization rate can be increased. Another object is to provide a cell stack and a redox flow battery having an increased electrode utilization rate.

Advantageous Effects of Present Disclosure

The electrode utilization rate can be increased by using the above-described bipolar plates of the present disclosure. The above-described cell stack according to the present disclosure and the above-described redox flow battery according to the present disclosure have high electrode utilization rates.

Description of Embodiments of Invention of Present Application

Embodiments of the invention of the present application will be described.

(1) A bipolar plate according to an embodiment of the present disclosure is arranged to face an electrode along which electrolyte is circulated, and includes a flow passage that is provided on at least one of front and back surfaces of the bipolar plate and along which the electrolyte is circulated. The flow passage provided on the at least one of the front and back surfaces of the bipolar plate includes an introduction path along which the electrolyte is introduced and a discharge path that does not communicate with and is independent of the introduction path and along which the electrolyte is discharged. At least one of the introduction path and the discharge path includes an inclined groove that non-orthogonally intersects a long side and a short side of an imaginary rectangle that includes an outer edge of the bipolar plate.

Here, the "introduction path" is any groove portion that forms the flow passage and that satisfies any of conditions ($\alpha$) to ($\gamma$) given below.

($\alpha$) One end of the groove portion opens at a portion of the peripheral edge of the bipolar plate at which the electrolyte is supplied (supply edge).

($\beta$) One end of the groove portion is connected to a distributing groove described below.

($\gamma$) The groove portion does not open at the supply edge nor is it connected to the distributing groove, and the distance from one end of the groove portion to the supply edge or the distributing groove is shorter than the distance from the other end of the groove portion to a discharge edge described below or a collecting groove described below.

Here, the "discharge path" is any groove portion that forms the flow passage and that satisfies any of conditions ($\chi$) to ($\omega$) given below.

($\chi$) One end of the groove portion opens at a portion of the peripheral edge of the bipolar plate at which the electrolyte is discharged (discharge edge).

($\psi$) One end of the groove portion is connected to a collecting groove described below.

($\omega$) The groove portion does not open at the discharge edge nor is it connected to the collecting groove, and the distance from one end of the groove portion to the discharge edge or the collecting groove is shorter than the distance from the other end of the groove portion to the above-described supply edge or the above-described distributing groove.

The "rectangle that includes the outer edge of the bipolar plate" is a rectangle defining the outline of the bipolar plate when the shape of the bipolar plate in plan view (outline) is rectangular (including square), and is a smallest rectangle that includes the outer edge of the bipolar plate when the bipolar plate does not have a rectangular shape in plan view.

The above discussions also apply to a bipolar plate according to (2) described below.

The above-described bipolar plate is configured such that the flow passage for the electrolyte provided on the at least one of the front and back surfaces thereof includes the inclined groove. Therefore, when an electrode of a redox flow battery (RF battery) is placed on the bipolar plate, the bipolar plate provides a higher electrode utilization rate than does the above-described bipolar plate having a flow passage that mainly includes a plurality of vertical grooves on the front and back surfaces thereof (hereinafter may be referred to as a vertical groove configuration according to the related art). The reason for this will be described below by way of examples.

When, for example, the introduction path includes the inclined groove, a groove end of the inclined groove that is far from an inlet of the inclined groove is shifted from the inlet toward one of the short sides of the above-described imaginary rectangle in accordance with the inclination angle of the inclined groove. In other words, the groove end is shifted toward a corner between a long side and a short side of the imaginary rectangle. When, for example, the discharge path includes the inclined groove, a groove end of the inclined groove that is far from an outlet of the inclined groove is shifted from the outlet toward a short side in accordance with the inclination angle of the inclined groove. In other words, this groove end is also shifted toward a corner between a long side and a short side. In either case, a region near a corner of the bipolar plate can serve as an electrolyte circulation region. When the electrode is placed on this bipolar plate, the electrolyte can be supplied to a region near a corner of the electrode through the above-described flow passage or discharged from a region near a corner of the electrode through the above-described flow passage.

Since the introduction path and the discharge path are independent of each other, the bipolar plate enables an efficient use of the electrolyte for a battery reaction due to the following reason. That is, when the electrode placed on the bipolar plate receives unreacted electrolyte that flows along the introduction path, a battery reaction occurs in a reaction region near a region of the electrode that corresponds to a groove portion that forms the introduction path (region of the electrode corresponding to a groove portion may hereinafter be referred to as a groove-facing region). In addition, reacted electrolyte can be discharged from the electrode to the discharge path of the bipolar plate in a groove-facing region of the electrode that corresponds to the discharge path. This electrode is capable of utilizing, as the battery reaction region, the region corresponding to the region between the groove portions that form the introduction and discharge paths (region of the electrode corresponding to the region between the groove portions may hereinafter be referred to as a ridge facing region). In addition, the unreacted electrolyte can be efficiently supplied to the reaction region, and the reacted electrolyte can be efficiently discharged from the reaction region.

The above-described bipolar plate realizes an increase in the electrode utilization rate and enables an efficient use of the electrolyte for the battery reaction as described above, and therefore contributes to, for example, a reduction in the internal resistance and an increase in the battery efficiency of an RF battery. In addition, since the flow passage is provided, the above-described bipolar plate has a high electrolyte circulation performance and contributes also to a reduction in loss, such as pump loss. The above-described bipolar plate may be used in either a single-cell battery that includes only one battery cell or a multi-cell battery that includes a plurality of battery cells that are stacked together.

(2) A bipolar plate according to another embodiment of the present disclosure is arranged to face an electrode along which electrolyte is circulated, and includes a flow passage that is provided on each of front and back surfaces of the bipolar plate and along which the electrolyte is circulated. The flow passage provided on at least one of the front and back surfaces of the bipolar plate includes an introduction path along which the electrolyte is introduced and a discharge path that does not communicate with and is independent of the introduction path and along which the electrolyte is discharged. At least one of the introduction path and the discharge path includes an inclined groove that non-orthogonally intersects a long side and a short side of an imaginary rectangle that includes an outer edge of the bipolar plate. The bipolar plate includes a pair of grooves arranged to intersect in a see-through plan view of the front and back surfaces of the bipolar plate, the pair of grooves including the inclined groove provided on one surface of the bipolar plate and a groove that forms the flow passage on another surface of the bipolar plate.

According to the above-described bipolar plate, similar to the bipolar plate according to (1), the flow passage for the electrolyte provided on at least one of the front and back surfaces includes the inclined groove. Therefore, the bipolar plate provides a higher electrode utilization rate than does the bipolar plate having the vertical groove configuration according to the related art. In addition, the bipolar plate enables an efficient use of the electrolyte for the battery reaction, and contributes to, for example, a reduction in the internal resistance and an increase in the battery efficiency of an RF battery. In addition, the above-described bipolar plate has the flow passage on each of the front and back surfaces thereof, and therefore has a high electrolyte circulation performance and contributes also to a reduction in loss, such as pump loss. The above-described bipolar plate is suitable for use in a multi-cell battery.

Although the above-described bipolar plate includes the flow passage on each of the front and back surfaces thereof, the region in which the inclined groove that forms the flow passage on one surface overlap the groove (which may or may not be the inclined groove) that forms the flow passage on the other surface in a see-through plan view can be reduced. For example, an intersecting region in which the grooves intersect may be the only region in which the grooves overlap. Therefore, one of positive and negative electrolytes that flows along the inclined groove provided on one surface of the above-described bipolar plate and the other of the positive and negative electrolytes that flows along the groove provided on the other surface flow in different regions except for the above-described intersecting region. Therefore, the above-described bipolar plate has a higher electrolyte circulation performance for both the positive and negative electrolytes, and loss, such as pump loss, can be more easily reduced than when the positive and negative electrolytes flow along the front and back surfaces of the bipolar plate in similar regions. In addition, according to the above-described bipolar plate, the reaction regions of positive and negative electrodes placed on the front and back surfaces of the bipolar plate can be shifted from each other, so that the battery reactions more easily occur. Accordingly, it can be expected that the electrolyte utilization rate can be further increased by using the above-described bipolar plate. In addition, since the region in which the grooves overlap is small as described above, the bipolar plate may be easily configured to have a sufficient strength even when the thickness of the bipolar plate is small and the depth of the inclined groove is somewhat large. Thus, according to the above-described bipolar plate, the number of inclined grooves can be easily increased, and the electrolyte can be easily uniformly supplied over a large area of the bipolar plate. Also for this reason, it can be expected that the electrode utilization rate can be further increased.

(3) The above-described bipolar plate may have, for example, a configuration in which the flow passage provided on the at least one of the front and back surfaces includes at least one pair of inclined grooves that are arranged next to each other, the pair of inclined grooves including the inclined groove included in the introduction path and the inclined groove included in the discharge path.

The above-described configuration provides a higher electrode utilization rate than does the vertical groove configuration according to the related art, and enables an efficient use of the electrolyte for the battery reaction due to the following reason. That is, the electrode placed on the bipolar plate having the above-described configuration receives the unreacted electrolyte in a groove-facing region corresponding to the inclined groove at the introduction side that is one of the above-described pair of inclined grooves, and discharges the reacted electrolyte in a groove-facing region corresponding to the inclined groove at the discharge side that is the other one of the above-described pair of inclined grooves. A ridge facing region corresponding to the region between the inclined groove at the introduction side and the inclined groove at the discharge side serves as a battery reaction region. Thus, the electrode includes the region in which the unreacted electrolyte is received, the battery reaction region, and the region in which the reacted electrolyte is discharged, and these regions can be arranged next to each other.

(4) The above-described bipolar plate including the pair of inclined grooves may have, for example, a configuration in which the flow passage provided on the at least one of the front and back surfaces is configured such that the introduction path and the discharge path each include a plurality of the inclined grooves, and includes an interdigitating region in which the inclined grooves included in the introduction path and the inclined grooves included in the discharge path are arranged to interdigitate with each other.

The above-described configuration provides a higher electrode utilization rate than does the vertical groove configuration according to the related art. In addition, when an electrode is placed on this bipolar plate, regions in which the unreacted electrolyte is received, battery reaction regions, and regions in which the reacted electrolyte is discharged can be arranged next to each other over a larger region. Accordingly, the electrolyte can be more efficiently used for the battery reaction.

(5) The above-described bipolar plate may have, for example, a configuration in which one end of the inclined groove opens at a peripheral edge of the bipolar plate.

The above-described configuration provides a higher electrode utilization rate than does the vertical groove configuration according to the related art. In addition, the bipolar plate is highly manufacturable since the inclined groove extends from the peripheral edge of the bipolar plate and has a simple shape.

(6) The above-described bipolar plate may have, for example, a configuration in which the introduction path includes a distributing groove that opens along a peripheral edge of the bipolar plate, the distributing groove being connected to one end of each of a plurality of the inclined grooves included in the introduction path and supplying the electrolyte to each of the inclined grooves, and in which the discharge path includes a collecting groove that opens along the peripheral edge of the bipolar plate at a side opposite to a side at which the distributing groove is provided, the collecting groove being connected to one end of each of a plurality of the inclined grooves included in the discharge path and collectively discharging the electrolyte from the inclined grooves.

In the above-described configuration, the introduction path and the discharge path each include a plurality of inclined grooves. According to the above-described configuration, even when inlets and outlets at the ends of the inclined grooves are separated from the supply edge or the discharge edge for the electrolyte in the peripheral edge of the bipolar plate, the electrolyte can be supplied to each of the inclined grooves at the introduction side through the distributing groove and discharged from each of the inclined grooves at the discharge side through the collecting groove. Therefore, even when, for example, the inclination angle is large, the area of the above-described interdigitating region can be easily increased. As a result, the above-described configuration provides a higher electrode utilization rate than does the vertical groove configuration according to the related art, and the electrolyte can be more efficiently used for the battery reaction.

(7) The above-described bipolar plate may have, for example, a configuration in which one end and another end of the inclined groove are shifted from each other by a distance greater than or equal to a groove width of the inclined groove.

According to the above-described configuration, the inclination angle is relatively large, although this also depends on the groove width. Accordingly, the above-described configuration provides a higher electrode utilization rate than does the vertical groove configuration according to the related art.

(8) The above-described bipolar plate may have, for example, a configuration in which the inclined groove has an inclination angle of 1° or more.

The "inclination angle of the inclined groove" is an angle with respect to the sides of the above-described imaginary rectangle that extend in a direction in which the electrolyte is circulated when the bipolar plate is attached to an RF battery.

The above-described configuration, in which the inclination angle is large, provides a higher electrode utilization rate than does the vertical groove configuration according to the related art, and contributes to, for example, a reduction in the internal resistance and an increase in the battery efficiency of an RF battery (see test example described below).

(9) The above-described bipolar plate may have, for example, a configuration in which the inclined groove has an inclination angle of 40° or less.

Since the inclination angle is in the above-described range, the above-described configuration provides a higher electrode utilization rate than does the vertical groove configuration according to the related art. In addition, since the inclination angle is not excessively large, the inclined groove has a high electrolyte circulation performance. Accordingly, the above-described configuration also contributes to, for example, a reduction in the internal resistance and an increase in the battery efficiency of an RF battery (see test example described below).

(10) A cell stack according to an embodiment of the present disclosure includes the bipolar plate according to any one of (1) to (9) described above.

Since the above-described cell stack includes the above-described bipolar plate in which the inclined groove is provided on at least one of the front and back surfaces as described above, the utilization rate of an electrode placed on the bipolar plate can be increased, and the electrolyte can be efficiently used for the battery reaction. Accordingly, the above-described cell stack contributes to, for example, a reduction in the internal resistance and an increase in the battery efficiency of an RF battery.

(11) The above-described cell stack may, for example, include a battery cell including a pair of bipolar plates, each of which has the inclined groove on at least one of the front and back surfaces, and have a configuration in which the pair of bipolar plates are arranged such that the inclined groove provided on a surface of one of the bipolar plates that faces a positive electrode and the inclined groove provided on a surface of another one of the bipolar plates that faces a negative electrode intersect.

In the above-described configuration, at least one of the inclination direction and the inclination angle may differ between the inclined grooves provided on the surfaces of the pair of bipolar plates that face each other, so that the inclined grooves that face each other intersect. According to the above-described configuration, the region in which the inclined grooves overlap in a see-through plan view of the pair of bipolar plates having the positive and negative electrodes disposed therebetween can be reduced. For example, an intersecting region in which the inclined grooves intersect may be the only region in which the inclined grooves overlap. Accordingly, the positive electrolyte that flows along the inclined groove on one bipolar plate and the negative electrolyte that flows along the inclined groove on the other bipolar plate can flow along the surfaces that face each other in different regions except for the above-described intersecting region. As a result, according to the above-described configuration, the electrode utilization rate can be further increased. In addition, compared to the configuration in which the positive and negative electrolytes flow along the surfaces that face each other in similar regions, the above-described configuration provides a higher electrolyte circulation performance for both the positive and negative electrolytes, so that a reduction in loss, such as pump loss, can be expected. In addition, according to the above-described configuration, the reaction regions of the positive and negative electrodes can be shifted from each other. Accordingly, the battery reactions easily occur, and a further increase in the electrolyte utilization rate can be expected.

(12) A redox flow battery (RF battery) according to an embodiment of the present disclosure includes the cell stack according to (10) or (11).

Since the above-described RF battery includes the above-described bipolar plate in which the inclined groove is provided on at least one of the front and back surfaces as described above, the utilization rate of the electrode placed on the bipolar plate can be increased as described above. Accordingly, the RF battery has a low internal resistance and a high battery efficiency (see test example described below). In addition, loss, such as pump loss, of the above-described RF battery can be reduced.

Detailed Description of Embodiments of Invention of Present Application

Embodiments of the invention of the present application will now be described with reference to the drawings. In the drawings, the same reference numerals denote components having the same names.

First Embodiment

Figure 2:
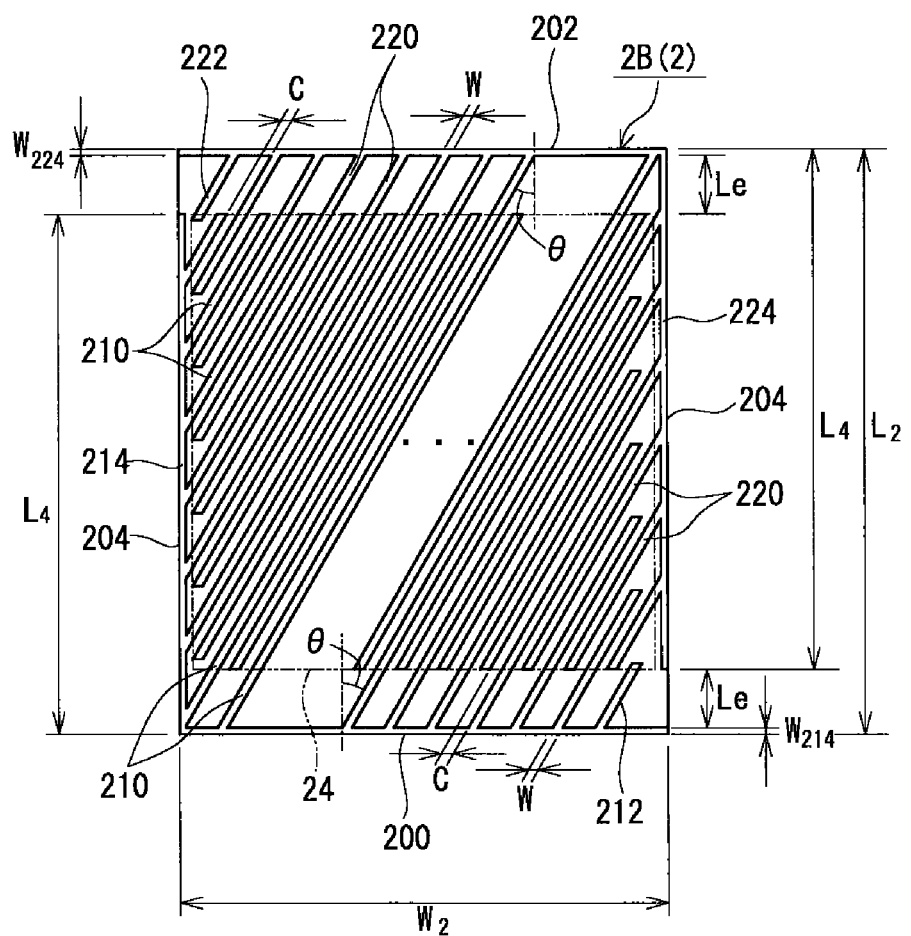
FIG. 2 is a schematic plan view of a bipolar plate according to a second embodiment.
Figure 4:
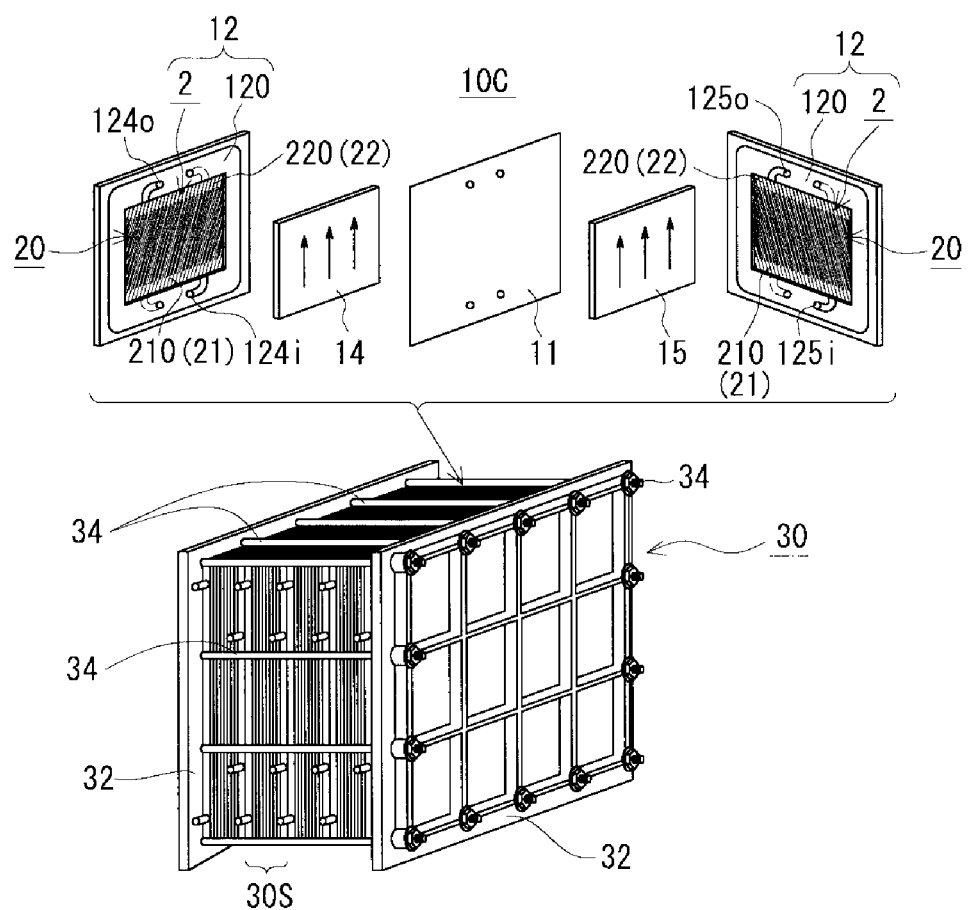
FIG. 4 is a schematic diagram illustrating an example of a cell stack according to an embodiment.

A bipolar plate 2A according to a first embodiment will be described with reference to FIG. 1.
(Summary)
The bipolar plate 2A according to the first embodiment, which serves as a component of an RF battery, is an electrically conductive flat plate that conducts current and blocks electrolyte. The bipolar plate 2A includes a flow passage along which electrolyte flows on at least one of front and back surfaces that faces an electrode (positive electrode 14 or negative electrode 15, see FIG. 4 described below) along which the electrolyte is circulated. The flow passage 20 provided on the at least one of the front and back surfaces of the bipolar plate 2A includes an introduction path 21 along which the electrolyte is introduced and a discharge path 22 that does not communicate with and is independent of the introduction path 21 and along which the electrolyte is discharged. The bipolar plate 2A according to the first embodiment, in particular, is configured such that at least one of the introduction path 21 and the discharge path 22 includes an inclined groove (for example, interdigitating grooves 210 and 220 in this case) that non-orthogonally intersects long and short sides of an imaginary rectangle that includes the outer edge of the bipolar plate 2A. In this example, the bipolar plate 2A has a rectangular shape in plan view. Therefore, the "long and short sides of an imaginary rectangle that includes the outer edge" correspond to the long and short sides that define the peripheral edge of the bipolar plate 2A. In the following description, among the four sides that define the peripheral edge of the bipolar plate 2A, the side near a supply path provided on a frame body 120 of a cell frame 12, which will be described below, may be referred to as a supply edge 200, and a side near a discharge path provided on the frame body 120 may be referred to as a discharge edge 202. In FIG. 1 and in FIG. 2 described below, the bottom edge is the supply edge 200 and the top edge is the discharge edge 202. In FIGS. 1 and 2, bipolar plates 2A and 2B each have a vertically elongated rectangular shape, and the short sides at the top and bottom serve as the supply edge 200 and the discharge edge 202. However, as illustrated in FIG. 4, a bipolar plate 2 may instead have a horizontally elongated rectangular shape, and the long sides at the top and bottom may serve as the supply edge 200 and the discharge edge 202.

The bipolar plate 2A of this example has the following structure.

(α) The introduction path 21 and the discharge path 22 of the flow passage 20 each include a plurality of inclined grooves, and one end of each inclined groove opens at the peripheral edge of the bipolar plate 2A (supply edge 200 or discharge edge 202). More specifically, the inclined grooves included in the introduction path 21 (interdigitating grooves 210 and separate grooves 212 described below) each have an inlet 215 that opens at the supply edge 200 of the bipolar plate 2A. The inclined grooves included in the discharge path 22 (interdigitating grooves 220 and separate grooves 222 described below) each include an outlet 225 that opens at the discharge edge 202 at a side (top side in FIG. 1) of the bipolar plate 2A that opposes the supply edge 200.

(β) The bipolar plate 2A includes an interdigitating region 24 (imaginary region surrounded by the two-dot chain lines in FIG. 1) in which the inclined grooves (interdigitating grooves 210) included in the introduction path 21 and the inclined grooves (interdigitating grooves 220) included in the discharge path 22 are arranged to interdigitate with each other. In other words, the bipolar plate 2A includes a plurality of pairs of inclined grooves, each pair including an inclined groove (interdigitating groove 210) included in the introduction path 21 and an inclined groove (interdigitating groove 220) included in the discharge path 22 that are arranged next to each other.

(γ) The inclined grooves (210, 212, 220, and 222) have an inclination angle θ of 1° or more and 40° or less. The bipolar plate 2A in this example and the bipolar plate 2B according to a second embodiment described below are both attached to an RF battery such that side edges 204 of the above-described imaginary rectangle extend in a direction in which the electrolyte is circulated. In FIGS. 1 and 2, the long sides are the side edges 204. In FIG. 4, the short sides are the side edges 204. In FIGS. 1 and 2, to facilitate understanding of the inclination angle θ, straight lines parallel to the side edges 204 are shown by the one-dot chain lines, and the inclination angle θ is shown as angles with respect to the straight lines.

(δ) In addition to the interdigitating grooves 210 and 220, inclined grooves (separate grooves 212 and 222) are provided in regions outside the interdigitating region 24 (lower left corner and upper right corner in FIG. 1). The separate grooves 212 and 222 are not arranged to interdigitate with each other.

In the example illustrated in FIG. 1, all of the inclined grooves have a parallelogram shape in plan view (when viewed in a direction orthogonal to the front and back surfaces of the bipolar plate 2A) and are inclined at the same inclination angle θ. Also, the inclined grooves are arranged in parallel at equal intervals in the width direction of the bipolar plate 2A (left-right direction in FIG. 1). In addition, the bipolar plate 2A includes a region in which some of the inclined grooves at an introduction side (interdigitating grooves 210) and some of the inclined grooves at a discharge side (interdigitating grooves 220) are alternately arranged. Although the inclined grooves are inclined leftward and upward in the illustrated example, the inclined grooves may instead be inclined rightward and upward as illustrated in FIG. 2.

Each of the inclined grooves at the introduction side has one end (inlet 215) on the supply edge 200 and the other end at a position shifted in the width direction of the bipolar plate 2A (leftward and upward in FIG. 1) in accordance with the inclination angle θ. Thus, the other end of each of the inclined grooves at the introduction side approaches the corner between the discharge edge 202 that opposes the supply edge 200 and one of the side edges 204 (left side edge 204 in FIG. 1). Each of the inclined grooves at the discharge side has one end (outlet 225) on the discharge edge 202 and the other end at a position shifted in the width direction of the bipolar plate 2A (rightward and downward in FIG. 1) in accordance with the inclination angle θ. Thus, the other end of each of the inclined grooves at the discharge side approaches the corner between the supply edge 200 and the other of the side edges 204 (right side edge 204 in FIG. 1).

According to the bipolar plate 2A, regions near the corners can serve as electrolyte circulation regions.

(Interdigitating Grooves)

Among the inclined grooves, one end of each of the interdigitating grooves 210 at the introduction side opens at the supply edge 200, and the other end is closed at a position separated from the discharge edge 202 by a length Le in a direction orthogonal to the discharge edge 202. One end of each of the interdigitating grooves 220 at the discharge side is open at the discharge edge 202, and the other end is closed at a position separated from the supply edge 200 by the length Le in a direction orthogonal to the supply edge 200. Since the other end of each of the interdigitating grooves 210 and 220 is closed, the interdigitating grooves 210 at the introduction side and the interdigitating grooves 220 at the discharge side form independent flow paths. A region in which the interdigitating grooves 210 at the introduction side extend and which excludes the area within the length Le from the supply edge 200 at the bottom side in FIG. 1 and a region in which the interdigitating grooves 220 at the discharge side extend and which excludes the area within the length Le from the discharge edge 202 at the top side in FIG. 1 define the interdigitating region 24. When an electrode is placed on the bipolar plate 2A, a region of the electrode that corresponds to the interdigitating region 24 includes reaction regions on both sides of groove-facing regions that correspond to the interdigitating grooves 210 and 220. The reaction regions of the electrode are provided between the interdigitating grooves 210 and 220. The groove-facing regions of the electrode that face the interdigitating grooves 210 at the introduction side serve as regions through which unreacted electrolyte is received, and the groove-facing regions of the electrode that face the interdigitating grooves 220 at the discharge side serve as regions through which the reacted electrolyte is discharged. Thus, the reaction regions of the electrode are disposed between the regions in which the unreacted electrolyte is received and the regions in which the reacted electrolyte is discharged.

As the area percentage of the interdigitating region 24 on the surface of the bipolar plate 2A increases, the above-described reaction regions of the electrode can be more easily increased. In addition, the unreacted electrolyte can be more easily supplied to the reaction region, and the reacted electrolyte can be more easily discharged from the reaction region. The above-described area percentage may be, for example, 60% or more, 70% or more, or 80% or more. To set the above-described area percentage in the above-described range, the length Le may be in the range of 5% or more and 20% or less of a length $L_2$ of the side edges 204, which are portions of the peripheral edge of the bipolar plate 2A that are orthogonal to the supply edge 200 or the discharge edge 202. The length $L_2$ of the side edges 204 is the length of portions of the peripheral edge of the bipolar plate 2A that extend mainly in the direction in which the electrolyte is circulated.

(Separate Grooves)

There may be a case where the interdigitating grooves 210 and 220 (interdigitating region 24) cannot be sufficiently provided and an electrolyte circulation region cannot be provided over a large area of the bipolar plate 2A depending on the shape of the bipolar plate 2A in plan view and the inclination angle θ. Accordingly, the inclined grooves at the introduction side may include separate grooves 212 that are not arranged adjacent to the inclined grooves at the discharge side and do not extend to a position separated from the supply edge 200 by a predetermined length (position separated from the discharge edge 202 by the length Le at the top in this example). The inclined grooves at the discharge side may include separate grooves 222 that are not arranged adjacent to the inclined grooves at the introduction side and do not extend to a position separated from the discharge edge 202 by a predetermined length (position separated from the supply edge 200 by the length Le at the bottom in this example). When the separate grooves 212 and 222 are provided, relatively small regions where the interdigitating grooves 210 and 220 cannot be provided, such as the regions near the lower left corner and the upper right corner in FIG. 1, can serve as the electrolyte circulation regions. The electrode placed on the bipolar plate 2A receives the electrolyte through groove-facing regions corresponding to the separate grooves 212, and a battery reaction occurs in reaction regions near the groove-facing regions. The reacted electrolyte is discharged to the discharge path 22 of the bipolar plate 2A through the electrode.

The numbers, etc., of the separate grooves 212 and 222 may be selected as appropriate. In addition, the separate grooves 212 at the introduction side, the separate grooves 222 at the discharge side, or both the separate grooves 212 and 222 may be omitted. In FIG. 1, the separate grooves 212 and 222 differ in groove length, but are the same in shape and magnitudes of, for example, the inclination angle θ, the groove width W, and the groove depth. However, these parameters may differ between the separate grooves 212 and 222. In addition, in FIG. 1, the separate grooves 212 and 222 and the interdigitating grooves 210 and 220 differ in groove length, but are the same in shape and magnitudes of, for example, the inclination angle θ. However, these parameters may differ between the separate grooves 212 and 222 and the interdigitating grooves 210 and 220. As the number of inclined grooves increases, the electrolyte can be easily uniformly supplied over a larger area of the bipolar plate 2A.

(Shape of Grooves)

The shape of the inclined grooves in plan view is typically a parallelogram shape as illustrated in FIG. 1. The inclined grooves have a constant groove width W (length along the supply edge 200 or the discharge edge 202 in this example) over the entire length thereof in the longitudinal direction. When the inclined grooves have a constant groove width W over the entire length thereof as in this example, the circulation pressure of the electrolyte does not easily vary, and the electrolyte circulation performance can be improved. When the inclined grooves all have the same shape as in this example, the number of inclined grooves in the bipolar plate 2A can be easily increased and the electrolyte can be easily uniformly supplied over a large area of the bipolar plate 2A, although this also depends on the groove width W and a distance C between the inclined grooves that are adjacent to each other.

The shape of the inclined grooves in cross section (shape in cross section taken along a plane parallel to the supply edge 200 or the discharge edge 202 in this example) is typically a rectangular shape (not shown in this example) having a bottom side parallel to the front and back surfaces of the bipolar plate 2A. In this case, the volume of the inclined grooves can be easily increased, and the electrolyte circulation performance can be improved. In addition, in this example, the inclined grooves all have the same groove depth over the entire length thereof, and the shape of the inclined grooves in any cross section is the same as the shape of the openings at the ends of the inclined grooves. In this case, the circulation pressure of the electrolyte does not easily vary in each inclined groove. Accordingly, not only can the electrolyte circulation performance be improved, but also the electrolyte can be easily uniformly circulated in all of the inclined grooves. As a result, it can be expected that the electrolyte circulation performance can be further improved and the electrolyte utilization rate can be further increased.

(Size of Grooves)

The inclination angle θ of the inclined grooves, the groove width W, the groove depth, and the groove length (length in the inclination direction in this example) of the inclined grooves, the distance C between the inclined grooves that are adjacent to each other, the size of the regions in which the interdigitating grooves 210 and 220 extend and that are outside the interdigitating region 24 and adjacent to the inlets 215 and the outlets 225 (for example, the length Le along the side edges 204), etc., can be set as appropriate. In this example, the inclined grooves all have the same groove width W and the same groove depth, and the interdigitating grooves 210 and 220 have the same groove length. Thus, the bipolar plate 2A can be easily formed in a simple shape, and is highly manufacturable. In FIGS. 1, 2, and 4, the inclined grooves are schematically illustrated and the parameters, such as the inclination angle θ, may not satisfy the ranges described below.

The inclination angle θ is in the range of or more than 0° and less than 90°. In particular, when the inclination angle θ is 1° or more, the rectangular bipolar plate 2A can be easily formed such that a large area including the regions near the corners thereof serves as an electrolyte circulation region by appropriately adjusting the number of inclined grooves, the groove width W, the groove length, and other parameters. As a result, the electrode utilization rate can be increased. As the inclination angle θ increases, the amount of shift between one and the other ends of each inclined groove in the width direction increases, and the inclined grooves can be more easily arranged in peripheral regions, such as the corners, of the bipolar plate 2A. Accordingly, the inclination angle θ may be set to 1.5° or more, 2° or more, or 2.5° or more. When the inclination angle θ is 40° or less, not only can the bipolar plate 2A be formed such that a large area thereof serves as the electrolyte circulation region as described above, but also the inclined grooves have a high electrolyte circulation performance since the inclination angle is not excessively large. In addition, a large number of inclined grooves can be easily arranged to open at the supply edge and the discharge edge, and this also leads to an improvement in the electrolyte circulation performance. Accordingly, the inclination angle θ may be set to less than 40°, 38° or less, 35° or less, 30° or less, 25° or less, or 20° or less.

Alternatively, for example, the inclination angle θ may be set to satisfy a condition that when viewed from one end (inlet 215 or outlet 225) of each inclined groove, the other end is shifted by a distance greater than or equal to the groove width W of the inclined grooves. When the above-described shift in the width direction is close to the groove width W for each inclined groove, the inclination angle θ is relatively large, so that the electrolyte circulation region on the bipolar plate 2A can be easily increased and that the electrode utilization rate can be increased accordingly, although this also depends on the groove width W. The above-described shift in the width direction may be greater than or equal to 1.2 times the groove width W, greater than or equal to 1.5 times the groove width W, or greater than or equal to twice the groove width W.

The groove width W may be, for example, about 0.5% or more and 5% or less, or about 0.5% or more and 2% or less, of the length $W_2$ of the supply edge 200 or the discharge edge 202 of the bipolar plate 2A. Alternatively, the groove width W may be 0.1 mm or more and 10 mm or less, 0.1 mm or more and 8 mm or less, 0.1 mm or more and 5 mm or less, or 0.5 mm or more and 3 mm or less. As the groove width W increases, the circulation resistance of the electrolyte that flows along the inclined grooves decreases, so that a reduction in the pressure loss can be expected. As the groove width W decreases, the number of inclined grooves can be easily increased, and the electrolyte can be easily uniformly supplied over a larger area of the bipolar plate 2A.

The groove depth may be, for example, about 10% or more and 45% or less of the thickness of the bipolar plate 2A. When the groove depth is in this range, even in the case where the front and back surfaces of the bipolar plate 2A each have a flow passage (in this case, the flow passage on at least one of the surfaces is the flow passage 20 including the inclined grooves), the mechanical strength of the bipolar plate 2A is not easily reduced, and the bipolar plate 2A has a sufficient strength. When the groove depth is 10% or more and 35% or less of the thickness of the bipolar plate 2A, the strength of the bipolar plate 2A can be further increased.

The groove length may be set as appropriate in accordance with, for example, the inclination angle θ and the size of the bipolar plate 2A. As the groove length increases, the length of the reaction regions of the electrode can be easily increased, and a higher battery reactivity can be expected. For example, the inclined grooves may include an inclined groove formed such that, in an imaginary right triangle having the inclined groove as a hypotenuse and an interior angle equal to the inclination angle θ, the side that forms the inclination angle θ between itself and the inclined groove has a length of 80% or more and 95% or less, or 85% or more and 90% or less, of the length $L_2$ of the side edges 204.

The distance C between the inclined grooves may be, for example, about 1 mm or more and 10 mm or less, or about 1.5 mm or more and 5 mm or less. As the distance C increases, the reaction regions of the electrode can be easily increased. As the distance C decreases, the number of inclined grooves can be easily increased, and the electrolyte can be easily uniformly supplied over a larger area of the bipolar plate 2A. FIG. 1 illustrates a configuration in which the distance between the inclined grooves at the introduction side and the distance between inclined grooves at the discharge side are both (2×C+groove width W) in the interdigitating region 24.

When the frame body 120 of the cell frame 12 includes a pair of frame pieces that support the bipolar plate by clamping the peripheral portion of the bipolar plate therebetween, the peripheral portion of the bipolar plate is covered by portions of the frame pieces near the inner peripheral edges of the frame pieces. When the bipolar plate 2A is attached to such a frame body, the bipolar plate 2A may have flow passages (flow passage on at least one surface is the flow passage 20 including the inclined grooves) in a region exposed at a window portion of the frame body 120. The bipolar plate 2A may have no flow passages on the portion thereof covered by the frame body 120. This discussion regarding the frame body also applies to a second embodiment described below.

(Flow Passages on Front and Back Surfaces)

The bipolar plate 2A may have a configuration (α) in which one of the front and back surfaces has the flow passage 20 including the inclined grooves and in which the other surface is flat and has no flow passage; a configuration (β1) in which both surfaces have electrolyte flow passages, the flow passage on one surface being the flow passage 20 including the inclined grooves and the flow passage on the other surface including no inclined grooves; and a configuration (β2) in which each of the surfaces has the flow passage 20 including the inclined grooves. In the configuration (β1), the flow passage on the other surface may include, for example, the above-described vertical and horizontal grooves. This bipolar plate 2A is configured such that, in a see-through plan view of the front and back surfaces, the inclined grooves provided on one surface intersect the vertical and horizontal grooves included in the flow passages on the other surface. In the configuration (β2), when at least one of the inclination direction and the inclination angle differs between the inclined grooves on the front surface and the inclined grooves on the back surface, the inclined grooves provided on one surface intersect the inclined grooves provided on the other surface in a see-through plan view of the front and back surfaces of the bipolar plate 2A (this configuration may hereinafter be referred to as a configuration (β2-1). The configuration (β2-1) may be a configuration in which the inclined grooves on one and the other surfaces have the same inclination angle and different inclination directions, a configuration in which the inclined grooves on one and the other surfaces have the same inclination direction and different inclination angles, or a configuration in which the inclined grooves on one and the other surfaces have different inclination angles and different inclination directions. The configuration (β2) may instead be a configuration (β2-2) in which the inclined grooves have the same inclination angle and the same inclination direction and substantially do not intersect. In the configuration (β2-2), the flow passages 20 on the front and back surfaces may have the same specifications so that inclined grooves on one surface of the bipolar plate 2A and the inclined grooves on the other surface of the bipolar plate 2A completely overlap in a see-through plan view. Alternatively, in the configuration (β2-2), the inclined grooves on one surface of the bipolar plate 2A and the inclined grooves on the other surface of the bipolar plate 2A may be shifted from each other so that at least portions thereof do not overlap in a see-through plan view. In this case, the regions in which the grooves on the front and back surfaces overlap can be reduced, so that the strength of the bipolar plate 2A can be easily increased. However, in this case, the number of inclined grooves tends to be reduced, and a reduction in the electrode utilization rate easily occurs. Therefore, the configurations (β1) and (β2-1), in which the grooves on the front and back surfaces are arranged to intersect, are more preferable. The flow passage 20 provided on at least one of the front and back surfaces preferably has the interdigitating region 24 as in this example. The discussions regarding the flow passages on the front and back surfaces also apply to the second embodiment described below.

(Material)

An electrically conductive material having a low electrical resistance that does not react to the electrolyte and that is resistant to electrolyte (resistant to chemicals, acids, etc.) is suitable for use as the material of the bipolar plate 2A according to the embodiment. The material preferably has an appropriate rigidity so that the shape and dimensions of the grooves that form the flow passage 20 do not easily vary for a long time and the effects of the flow passage 20 (for example, improvement in the electrode utilization rate, reduction in the circulation resistance, and reduction in loss, such as pump loss) can be reliably obtained.

Examples of the material include a composite material containing a carbon material and an organic material. More specifically, the material may be an electrically conductive plastic containing an electrically conductive inorganic material, such a graphite, and an organic material, such as a polyolefin-based organic compound or a chlorinated organic compound.

The bipolar plate 2A including the flow passage 20 may be manufactured by forming the above-described material into a plate shape by a commonly known method, such as injection molding, press forming, or vacuum forming, and forming the flow passage 20. The bipolar plate 2A is highly manufacturable when the flow passage 20 is formed at the same time. The flow passage 20 may instead be formed by cutting a flat-plate-shaped material having no flow passage 20.

(Main Effects)

Since the bipolar plate 2A according to the first embodiment includes specific inclined grooves (210, 220, 212, and 222), the regions near the corners thereof, for example, can serve as the electrolyte circulation regions, and the overall circulation region can be increased. Accordingly, the bipolar plate 2A of the first embodiment provides an increase in the electrode utilization rate when included in an RF battery. The introduction path 21 and the discharge path 22 on the bipolar plate 2A of this example both have the inclined grooves. This also contributes to an increase in the circulation region and an increase in the electrode utilization rate. In addition, the bipolar plate 2A of this example includes a large number of inclined grooves (including the separate grooves 212 and 222), and this also contributes to an increase in the electrode utilization rate.

The bipolar plate 2A according to the first embodiment is configured such that the introduction path 21 and the discharge path 22 do not communicate with each other. Accordingly, when an electrode is placed on the bipolar plate 2A, the electrode receives the electrolyte from the introduction path 21 in the groove-facing regions corresponding to the introduction path 21, causes a battery reaction in the reaction regions that are near the groove-facing regions (on both sides of the groove-facing regions in this example), and then discharges the reacted electrolyte from the reaction regions to the discharge path 22 of the bipolar plate 2A through the groove-facing regions corresponding to the discharge path 22. Thus, the bipolar plate 2A according to the first embodiment enables an efficient use of the electrolyte for the battery reaction when included in an RF battery. The bipolar plate 2A of this example is configured such that the introduction path 21 and the discharge path 22 include the inclined grooves (interdigitating grooves 210 and 220) arranged to interdigitate with each other. Therefore, the electrolyte can be efficiently used for the battery reaction.

In addition, the bipolar plate 2A of this example is highly manufacturable because the inclined grooves open at the supply edge 200 and the discharge edge 202 of the bipolar plate 2A.

Second Embodiment

The bipolar plate 2B according to the second embodiment will now be described with reference to FIG. 2.

(Summary)

The basic structure of the bipolar plate 2B according to the second embodiment is similar to that of the bipolar plate 2A according to the first embodiment, and a flow passage 20 including an introduction path 21 and a discharge path 22 is provided on a surface of the bipolar plate 2B that faces an electrode. At least one of the introduction path 21 and the discharge path 22 includes inclined grooves (210, 212, 220, and 222). The bipolar plate 2B according to the second embodiment mainly differs from that of the first embodiment in that the introduction path 21 includes a distributing groove 214, the discharge path 22 includes a collecting groove 224, and the inclination angle θ is relatively large. The distributing groove 214 extends along a portion of the peripheral edge of the bipolar plate 2B including a supply edge 200, and opens at this portion of the peripheral edge. The collecting groove 224 extends along a portion of the peripheral edge of the bipolar plate 2B including a discharge edge 202, and opens at this portion of the peripheral edge. In the following description, the difference from the first embodiment will be described in detail, and detailed description of the structure (shapes, sizes, etc.) and effects similar to those in the first embodiment will be omitted.

When the inclination angle θ is relatively large as in FIG. 2 (inclination angle θ is 30° in FIG. 2), a large number of inclined grooves tend to have both ends thereof separated from the supply edge 200 and the discharge edge 202. These inclined grooves cannot easily receive the electrolyte directly from the supply edge 200 or discharge the electrolyte directly from the discharge edge 202. Accordingly, the bipolar plate 2B of the second embodiment includes the distributing groove 214 and the collecting groove 224 that are configured such that some of the inclined grooves that are separated from the supply edge 200 and the discharge edge 202 and disposed near the side edges 204, 204 receive the electrolyte from the distributing groove 214 and discharge the electrolyte to the collecting groove 224.

The distributing groove 214, which forms a portion of the introduction path 21, is an L-shaped groove including a supply-edge portion that extends along the supply edge 200 of the bipolar plate 2B and opens at the supply edge 200 and a side-edge portion that extends along a corresponding side edge 204 and opens at the side edge 204. Among a plurality of the inclined grooves (interdigitating grooves 210 in this example) included in the introduction path 21, the inclined grooves disposed near the side edge 204 are each connected to the side-edge portion of the distributing groove 214 at one end thereof. Therefore, the electrolyte can be supplied to each of the inclined grooves disposed near the side edge 204 through the distributing groove 214. The introduction path 21 illustrated in FIG. 2 includes both the inclined grooves connected to the side-edge portion and the inclined grooves connected to the supply-edge portion, and all of these inclined grooves open in the distributing groove 214. The supply-edge portion of the distributing groove 214 may have a length shorter than that of the supply edge 200. In this case, among the inclined grooves included in the introduction path 21, some of the inclined grooves that are disposed near the supply edge 200 may open at the supply edge 200 while the other inclined grooves open at the supply-edge portion. Alternatively, all of the inclined grooves disposed near the supply edge 200 may open at the supply edge 200 so that no inclined grooves are connected to the supply-edge portion of the distributing groove 214. When the supply-edge portion extends over the entire length of the supply edge 200 as illustrated in FIG. 2, the supply-edge portion may serve also as a rectifying groove. In this case, it is not necessary that the frame body 120 include a rectifying groove.

The collecting groove 224, which forms a portion of the discharge path 22, is an L-shaped groove including a discharge-edge portion that extends along the discharge edge 202 of the bipolar plate 2B and opens at the discharge edge 202 and a side-edge portion that extends along a corresponding side edge 204 and opens at the side edge 204. Thus, the collecting groove 224 opens along portions (discharge edge 202 and right side edge 204) of the peripheral edge of the bipolar plate 2B that oppose the portions (supply edge 200 and left side edge 204) along which the distributing groove is provided. Among the inclined grooves (interdigitating grooves 220 in this example) included in the discharge path 22, the inclined grooves disposed near the side edge 204 are each connected to the side-edge portion of the collecting groove 224 at one end thereof. Therefore, the electrolyte from each of the inclined grooves disposed near the side edge 204 can be collected and discharged through the collecting groove 224. The discharge path 22 illustrated in FIG. 2 includes both the inclined grooves connected to the side-edge portion and the inclined grooves connected to the discharge-edge portion, and all of these inclined grooves open in the collecting groove 224. The discharge-edge portion of the collecting groove 224 may have a length shorter than that of the discharge edge 202. In this case, among the inclined grooves included in the discharge path 22, some of the inclined grooves that are disposed near the discharge edge 202 may open at the discharge edge 202 while the other inclined grooves open at the discharge-edge portion. Alternatively, all of the inclined grooves disposed near the discharge edge 202 may open at the discharge edge 202 so that no inclined grooves are connected to the discharge-edge portion of the collecting groove 224. When the discharge-edge portion extends over the entire length of the discharge edge 202 as illustrated in FIG. 2, the discharge-edge portion may serve also as a rectifying groove. In this case, it is not necessary that the frame body 120 include a rectifying groove.

The groove widths $W_{214}$ and $W_{224}$, the groove depths, the groove lengths (lengths of the supply-edge portion and the discharge-edge portion along the supply edge 200 and the discharge edge 202, respectively, and the length $L_4$ of the side-edge portions along the side edges 204), etc., of the distributing groove 214 and the collecting groove 224 may be set as appropriate. The lengths of the supply-edge portion and the discharge-edge portion may be set in the range of less than or equal to the length $W_2$ of the supply edge 200 and the discharge edge 202, and may be $W_2$ as in this example, or be, for example, 5% or more and 10% or less, or 5% or more and 8% or less, of the length $W_2$. The length $L_4$ may be set in the range of less than the length $L_2$ of the side edges 204, and may be, for example, 80% or more and 95% or less, or 85% or more and 90% or less, of the length $L_2$. The groove widths $W_{214}$ and $W_{224}$ and the groove depths may be set as in the description regarding the inclined grooves. At least one of the groove width $W_{214}$, $W_{224}$, the groove depth, and the groove length may differ between the distributing groove 214 and the collecting groove 224. However, when the distributing groove 214 and the collecting groove 224 have the same groove width, the same groove depth, and the same groove length as in this example, the bipolar plate 2B can be easily formed in a simple shape, and is highly manufacturable.

(Main Effects)

Similar to the first embodiment, the bipolar plate 2B according to the second embodiment includes specific inclined grooves (210, 220, 212, and 222), and therefore provides an increase in the electrode utilization rate when included in an RF battery. In addition, similar to the first embodiment, the bipolar plate 2B according to the second embodiment includes the introduction path 21 and the discharge path 22 that are independent of each other, and therefore enables an efficient use of the electrolyte for the battery reaction when included in an RF battery.

In particular, the bipolar plate 2B according to the second embodiment is configured such that the inclination angle θ of the inclined grooves is relatively greater than that in the bipolar plate 2A according to the first embodiment, and includes the distributing groove 214 and the collecting groove 224. The bipolar plate 2B includes the inclined grooves connected to the distributing groove 214 and the inclined grooves connected to the collecting groove 224. The electrolyte can be supplied to the inclined grooves at the introduction side (interdigitating grooves 210 in this example) through the distributing groove 214, and discharged from the inclined grooves at the discharge side (interdigitating grooves 220 in this example) through the collecting groove 224. In other words, the electrolyte can be smoothly introduced and discharged not only through the inclined grooves that open at the supply edge 200 and the discharge edge 202 but also through the inclined grooves disposed near the side edges 204. The above-described bipolar plate 2B according to the second embodiment enables an efficient use of the electrolyte for the battery reaction when included in an RF battery. When the inclination angle θ of the inclined grooves is as large as, for example, 1° or more, the number of inclined grooves can be easily increased by forming the distributing groove 214 and the collecting groove 224. In addition, the inclined grooves may be arranged to serve as the interdigitating grooves 210 and 220, so that the interdigitating region 24 can be increased. As a result, the electrolyte can be efficiently used for the battery reaction.

Third Embodiment

An RF battery 10 according to an embodiment and a cell stack 30 according to an embodiment will be described with reference to FIGS. 3 to 5.

Figure 3:
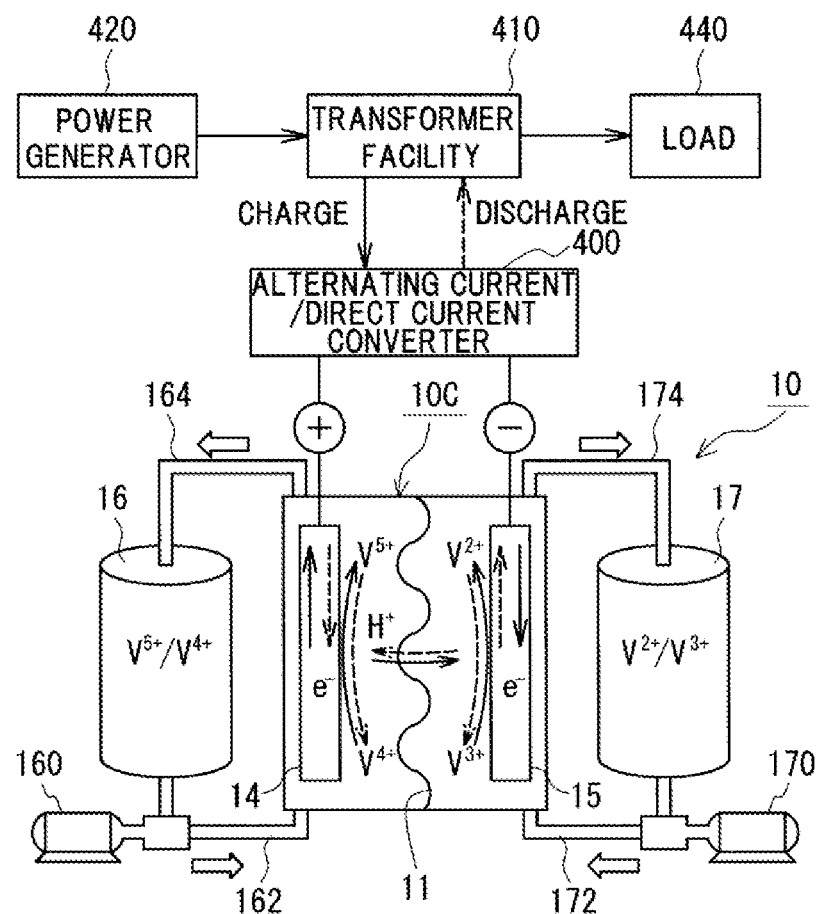
FIG. 3 illustrates the basic structure and the basic operation principle of a redox flow battery according to an embodiment.
Figure 5:
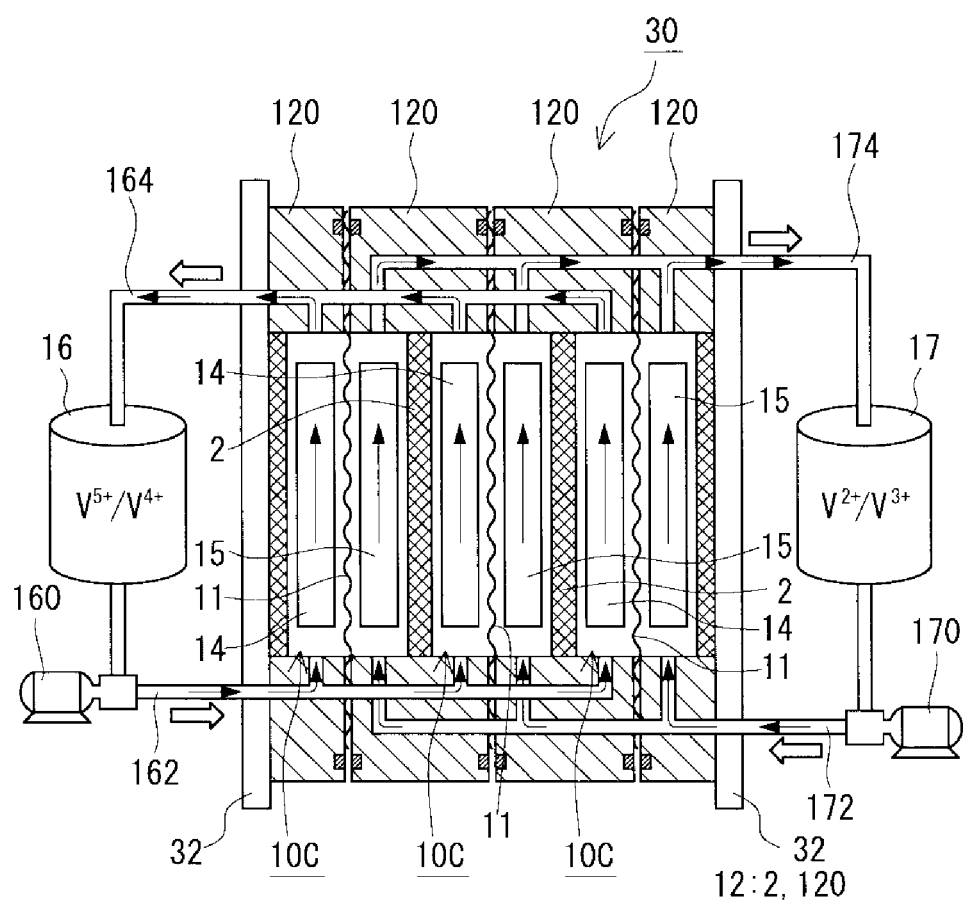
FIG. 5 is a schematic diagram illustrating a redox flow battery according to an embodiment that includes the cell stack.

In FIGS. 3 and 5, ions shown in a positive electrolyte tank 16 and a negative electrolyte tank 17 are examples of types of ions contained in positive and negative electrolytes. In FIG. 3, the solid line arrows represent a charging operation, and the broken line arrows represent a discharging operation.

The RF battery 10 according to the embodiment is a single-cell battery (FIG. 3) or a multi-cell battery (FIGS. 4 and 5) including bipolar plates 2 that are each provided with the flow passage 20 (FIG. 4) including the specific inclined grooves described in the first and second embodiments. The cell stack 30 according to the embodiment includes the bipolar plates 2 that are each provided with the flow passage 20 (FIG. 4) including the specific inclined grooves described in the first and second embodiments, and is included in a multi-cell battery. The structures of the RF battery 10 and the cell stack 30 will now be described.
(Summary of RF Battery)

As illustrated in FIG. 3, the RF battery 10 includes a battery cell 10C and a circulation mechanism that circulates the electrolyte through the battery cell 10C. Typically, the RF battery 10 is connected to a power generator 420 and load 440, such as a power system or a consumer, through, for example, an alternating current/direct current converter 400 and a transformer facility 410. The RF battery 10 is charged with electricity with the power generator 420 serving as an electric power source, and discharges electricity to supply electric power to the load 440. The power generator 420 is, for example, a solar photovoltaic power generator, a wind power generator, or a common power station.
(Basic Structure of RF Battery)
Battery Cell As illustrated in FIG. 4, the battery cell 10C includes a positive electrode 14 to which positive electrolyte is supplied, a negative electrode 15 to which negative electrolyte is supplied, a membrane 11 interposed between the positive electrode 14 and the negative electrode 15, and a pair of bipolar plates 2, 2 between which the positive electrode 14 and the negative electrode 15, which have the membrane 11 therebetween, is disposed.

The positive electrode 14 and the negative electrode 15 serve as reaction fields to which the electrolytes containing active materials are supplied and in which battery reactions of the active materials (ions) occur, and are composed of, for example, porous materials, such as fiber aggregates of carbon materials.

The membrane 11 is a member that separates the positive electrode 14 and the negative electrode 15 from each other and transmits predetermined ions, and is composed of, for example, an ion-exchange membrane.
Cell Frame The battery cell 10C typically includes cell frames 12 illustrated in FIG. 4. Each cell frame 12 includes the bipolar plate 2 and a frame body 120 formed along the outer periphery of the bipolar plate 2. A single-cell battery including a single battery cell 10C includes a single pair of cell frames 12, 12. A multi-cell battery including a plurality of battery cells 10C includes a plurality of pairs of cell frames 12. The multi-cell battery may include a plurality of bipolar plates 2 which each have one surface facing a positive electrode 14 and the other surface facing a negative electrode 15 and which are each typically provided with a positive-electrolyte flow passage on one surface and a negative-electrolyte flow passage on the other surface. Although the shape of each bipolar plate 2 in plan view (outline) is rectangular in FIG. 4, the bipolar plate 2 may have any appropriate shape in plan view. FIG. 4 illustrates an example in which each bipolar plate is the bipolar plate 2A according to the first embodiment having the flow passage 20 that includes the inclined grooves serving as the interdigitating grooves 210 and 220 and that does not include the distributing groove 214 and the collecting groove 224.

Each frame body 120 is a member that supports the corresponding bipolar plate 2 and is used to supply the electrolytes to the electrodes placed on the bipolar plate 2 and discharge the electrolytes from the electrodes. FIG. 4 illustrates rectangular frames which each have a rectangular window portion (through hole) at the center thereof as an example. The frame body 120 is made of, for example, a resin that is highly resistant to electrolyte and electrically insulating. The frame body 120 has supply paths and discharge paths for the electrolytes. The supply paths include electrolyte inlets (124*i* for the positive electrolyte and 125*i* for the negative electrolyte) and slits that extend from the electrolyte inlets to the window portion. The discharge paths include electrolyte outlets (124*o* for the positive electrolyte and 125*o* for the negative electrolyte) and slits that extend from the window portion to the electrolyte outlets. The bipolar plate 2 is arranged such that the supply edge 200 (FIGS. 1 and 2) thereof is in contact with a portion of the inner peripheral edge of the frame body 120 that is connected to the above-described supply paths and the discharge edge 202 thereof is in contact with a portion of the inner peripheral edge of the frame body 120 that is connected to the above-described discharge paths.

Rectifying grooves (not shown) may be provided in an inner peripheral region that extends along the inner peripheral edge of the frame body 120 and that is between the peripheral edge of the window portion and the above-described slits. In FIG. 4, supply-side rectifying grooves may be provided along the bottom edge of the window portion, and discharge-side rectifying grooves may be provided along the top edge of the window portion. When the rectifying grooves are provided, the electrolytes can be easily introduced and discharged uniformly along the width direction of the bipolar plate 2 and the electrodes (direction along the top and bottom edges in FIG. 4). The bipolar plate 2 may have rectifying grooves (not shown) that extend along the peripheral edge of the bipolar plate 2 in place of the rectifying grooves in the frame body 120.

Cell Stack

As illustrated in FIGS. 4 and 5, the cell stack 30 includes a layered body in which a plurality of cell frames 12 (bipolar plates 2), a plurality of positive electrodes 14, a plurality of membranes 11, and a plurality of negative electrodes 15 are arranged in a certain order and stacked together; a pair of end plates 32, 32 that clamp the layered body; connecting members 34, such as long bolts, that connect the end plates 32, 32; and fastening members, such as nuts. When the end plates 32, 32 are tightened by the fastening members, the layered body is retained in the layered state by a tightening force applied in the stacking direction.

The cell stack 30 may be configured to include a plurality of sub-cell stacks 30S that are stacked together, each sub-cell stack 30S including a predetermined number of battery cells 10C.

The cell frames on both ends of the sub-cell stack 30S or the cell stack 30 in the direction in which the battery cells 10C are stacked each have a current collector plate including the bipolar plate 2.

The frame bodies 120, 120 that are adjacent to each other have sealing members disposed therebetween so that the layered body is liquid-tight.

Circulation Mechanism

As illustrated in FIGS. 3 and 5, the circulation mechanism includes the positive electrolyte tank 16 storing the positive electrolyte to be circulated and supplied to each positive electrode 14, the negative electrolyte tank 17 storing the negative electrolyte to be circulated and supplied to each negative electrode 15, pipes 162 and 164 that connect the positive electrolyte tank 16 to each battery cell 10C (cell stack 30), pipes 172 and 174 that connect the negative electrolyte tank 17 to each battery cell 10C (cell stack 30), and the pumps 160 and 170 provided on the pipes 162 and 172 through which the electrolytes are supplied to each battery cell 10C. The pipes 162, 164, 172, and 174 are connected to electrolyte circulation passages formed of the electrolyte inlets 124i and 125i and the electrolyte outlets 124o and 125o in the cell frames 12 that are stacked, thereby forming circulation circuits for the positive and negative electrolytes.

The RF battery 10 and the cell stack 30 may have commonly known basic structures, materials, etc., as appropriate. Also, commonly known electrolytes may be used as appropriate.

(Example of Structure of RF Battery)

In a single-cell battery according to the embodiment, at least one of the pair of bipolar plates 2, 2 included in the battery cell 10C is provided with the above-described flow passage 20 including the inclined grooves on a surface thereof that faces an electrode. The pair of bipolar plates 2, 2 may be configured such that only one of the bipolar plates 2 is provided with the flow passage 20 including the inclined grooves. However, the bipolar plates 2, 2 are preferably both provided with the flow passage 20 including the inclined grooves since the utilization rate of both the positive and negative electrodes 14 and 15 can be increased in such a case. The bipolar plates 2 may be formed such that the flow passage 20 is provided on both the front and back surfaces thereof.

The multi-cell battery according to the embodiment includes a plurality of bipolar plates 2 that are each provided with a flow passage on the front and back surfaces thereof. These bipolar plates 2 may each have the configuration (β1) in which the inclined grooves are provided on only one surface thereof or the configuration (β1) in which the inclined grooves are provided on both surfaces thereof. In particular, a bipolar plate 2 having the configuration (β2-1) in which the inclined grooves on one and the other surfaces intersect in a see-through plan view is preferably provided because the utilization rate of both the positive and negative electrodes 14 and 15 can be increased in such a case. The bipolar plate 2 having the configuration (β2-1) may be provided with, for example, the flow passage 20 including the inclined grooves that are inclined leftward and upward as illustrated in FIG. 1 on one surface thereof and the flow passage 20 including the inclined grooves that are inclined rightward and upward as illustrated in FIG. 2 on the other surface thereof. According to the configurations (β1) and (β2-1), the regions in which the grooves overlap in a see-through plan view of the front and back surfaces of the bipolar plate 2 can be reduced. Intersecting regions in which the grooves intersect may be the only regions in which the grooves overlap, although this also depends on the inclination angle θ, the groove width W, and the distance C (FIGS. 1 and 2). Therefore, the positive electrolyte that flows along the inclined grooves on one surface of this bipolar plate 2 and the negative electrolyte that flows along the inclined grooves on the other surface flow in different regions except for the above-described intersecting regions. Thus, the electrolyte circulation performance can be improved for both the positive and negative electrolytes. As a result, a reduction in loss, such as pump loss, can be expected. In addition, the reaction regions of the positive electrode 14 and the negative electrode 15, between which the bipolar plate 2 is disposed, can be shifted from each other. Accordingly, the battery reactions easily occur, and an increase in the electrolyte utilization rate can be expected. In addition, even when the bipolar plate 2 has a small thickness and a relatively large groove depth, the bipolar plate 2 can be easily configured to have a sufficient strength, and the number of inclined grooves can be increased. Therefore, according to this bipolar plate 2, it can be expected that the electrolyte can be easily uniformly supplied over a large area and that the electrode utilization rate can be easily increased.

The bipolar plates 2 that are arranged to face each other are preferably configured such that at least one of the flow passage provided on a surface of one of the bipolar plates 2 (left bipolar plate 2 in FIG. 4) that faces the positive electrode 14 and the flow passage provided on a surface of the other bipolar plate 2 (right bipolar plate 2 in FIG. 4) that faces the negative electrode includes the inclined grooves, and such that the inclined grooves included in one of the flow passages intersect the grooves included in the other flow passage. According to this configuration, the regions in which the grooves overlap in a see-through plan view of the pair of bipolar plates 2, 2 can be reduced. Intersecting regions in which the grooves intersect may be the only regions in which the grooves overlap, although this also depends on the inclination angle θ, the groove width W, and the distance C (FIGS. 1 and 2). Therefore, one of the electrolytes that flows along the inclined grooves on one of the bipolar plates 2 and the other electrolyte that flows along the grooves included in the flow passages on the other bipolar plate 2 flow along the surfaces that face each other in different regions except for the above-described intersecting regions. Thus, the electrolyte circulation performance can be improved for both the positive and negative electrolytes. As a result, a further reduction in loss, such as pump loss, can be expected. In addition, according to this configuration, the reaction regions of the positive electrode 14 and the negative electrode 15 can be shifted from each other. Accordingly, the battery reactions easily occur, and an increase in the electrolyte utilization rate can be expected. In this configuration, one of the bipolar plates 2 may include the inclined grooves while the other bipolar plate 2 includes the above-described vertical grooves and horizontal grooves. However, preferably, the bipolar plates 2 both include the inclined grooves, and the inclined grooves on one of the bipolar plates 2 intersect the inclined grooves on the other bipolar plate 2. In such a case, not only the electrolyte circulation performance and the electrolyte utilization rate, but also the electrode utilization rate can be increased. The shapes of the grooves that form the flow passages on the pair of bipolar plates 2, 2 and the inclination direction, the inclination angle, etc., of the inclined grooves may be set so that the grooves that form the flow passages intersect when the bipolar plates 2 are arranged to face each other. When the pair of bipolar plates 2 arranged to face each other have the configuration (β1) or (β2-1), in which the grooves that form the flow passages on both surfaces intersect in a see-through plan view, the positions, for example, of the bipolar plates 2 may be adjusted so that the grooves on the surfaces that face each other intersect.

The bipolar plates 2 that are arranged to face each other may instead be configured such that the inclined grooves provided on a surface of one of the bipolar plates 2 that faces the positive electrode 14 and the inclined grooves provided on a surface of the other bipolar plate 2 that faces the negative electrode have the same inclination direction and the same inclination angle and substantially do not intersect. In this case, when the inclined grooves on one of the bipolar plates 2 that face each other and the inclined grooves on the other bipolar plate 2 are shifted from each other so that at least portions of the inclined grooves do not overlap, the above-described regions in which the inclined grooves overlap can be reduced, and the electrolyte circulation performance can be increased. However, in this case, the number of inclined grooves tends to be reduced, and a reduction in the electrode utilization rate easily occurs. Therefore, the above-described configuration in which the grooves that face each other intersect is more preferable.

(Main Effects)

The RF battery 10 according to the embodiment includes the bipolar plates 2 (2A, 2B, etc.) according to the embodiment, and therefore has a high electrode utilization rate. As a result, the RF battery 10 has a low internal resistance and a high battery efficiency. This effect will be further described in Test Example 1. In addition, the RF battery 10 includes the bipolar plates 2 which are each provided with the flow passage 20, and therefore has a high electrolyte circulation performance and low loss, for example, low pump loss. The cell stack 30 according to the embodiment includes the bipolar plates 2 (2A, 2B, etc.) according to the embodiment, and therefore has a high electrode utilization rate. Accordingly, an RF battery having a low internal resistance and a high battery efficiency or an RF battery with low loss, for example, low pump loss, can be formed by using the cell stack 30.

Test Example 1

Bipolar plates including inclined grooves having various inclination angles θ were prepared, and RF batteries including the bipolar plates were manufactured. The internal resistance and current efficiency of each RF battery were determined.

The specifications of the bipolar plates used in this test are given below. The shape of the prepared bipolar plates was generally close to that of the bipolar plate 2B illustrated in FIG. 2.

Shape of bipolar plates in plan view: Rectangular
Long side length: 18 cm (corresponds to length $L_2$ of side edges in this example)
Short side length: 15 cm (corresponds to length $W_2$ of supply and discharge edges in this example)
Thickness: 3 mm
Inclination angle θ of inclined grooves: 1°, 3°, 10°, 20°, 23°, 30, and 40°
Groove width W of inclined grooves: 1 mm
Groove depth of inclined grooves: 1 mm
Distance C between inclined grooves: 2 mm
Interdigitating region: Provided, Separate grooves: Not provided
Distributing and collecting grooves: Provided, Groove widths $W_{214}$ and $W_{224}$: 5 mm, Groove depth: 1 mm
Lengths of supply-edge and discharge-edge portions: Same as short side length (15 cm)
Length $L_4$ of side-edge portions: 17 cm $(=L_2-(Le+W_{214})=L_2-(Le+W_{224}))$
Length Le of regions other than interdigitating region: 5 mm The prepared bipolar plates each had the inclined grooves on both the front and back surfaces thereof. The bipolar plates were configured such that the inclined grooves on the front and back surfaces thereof had the same inclination angle θ and different inclination directions so that the inclined grooves on the front and back surfaces intersect in see-through plan views of the bipolar plates. These bipolar plates were used to form RF batteries (Samples No. 1 to No. 7).

Single-cell batteries and multi-cell batteries were both prepared. In each battery, the bipolar plates were arranged such that the inclined grooves provided on the bipolar plates that face each other intersect.

As a comparative example, rectangular bipolar plates having the same size (18 cm×15 cm) and including vertical grooves, that is, grooves with an inclination angle of 0°, were prepared, and used to form an RF battery (Sample No. 100). These bipolar plates do not include the inclined grooves, the distributing groove, or the collecting groove, and includes vertical grooves at the introduction side that open at the supply edge and that extend in a direction orthogonal to the supply edge, and vertical grooves at the discharge side that open at the discharge edge, that extend in a direction orthogonal to the discharge edge, and that are independent of the vertical grooves at the introduction side. The vertical grooves at the introduction side and the vertical grooves at the discharge side are alternately arranged in an interdigitating region. The width of the vertical grooves was 1 mm, the depth of the vertical grooves was 1 mm, the distance between the grooves was 2 mm, the length of the interdigitating region in the long-side direction was 17 cm, and the length of the regions provided outside the interdigitating region at the introduction side and the discharge side was 5 mm. A single-cell battery and a multi-cell battery were both prepared as the batteries of the comparative example.

Figure 6:
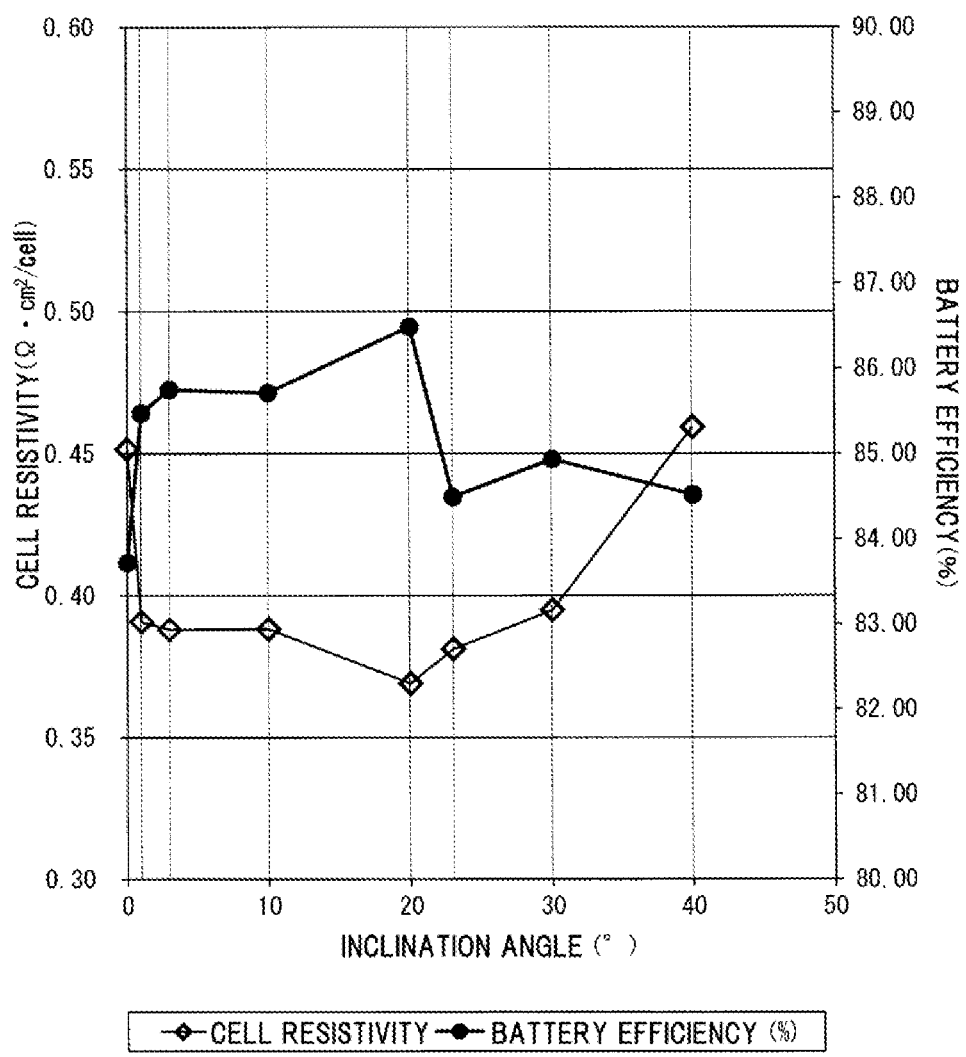
FIG. 6 is a graph showing the relationships between the inclination angle of inclined grooves on a bipolar plate and the cell resistivity and between the inclination angle and the battery efficiency for each sample of the redox flow battery measured in Test Example 1.

The prepared RF batteries were subjected to a charge-discharge test at a constant current (54 A in this example). In this test, vanadium-based electrolytes were used, and the temperature of the electrolytes was set to 35° C. The flow rates of the positive and negative electrolytes were both set to 0.7 L/min, and the RF batteries were charged and discharged for three cycles. The charge voltage and the discharge voltage were measured for two of the three cycles excluding the first cycle, and the cell resistance ($\Omega \cdot cm^2$/cell) was determined by using the average charge voltage and the average discharge voltage of the two cycles. The results are shown in FIG. 6 and Table 1.

In addition, the battery efficiency (%) was determined as below. The results are shown in FIG. 6 and Table 1.

Current Efficiency (%)=(Discharge Time/Charge Time)×100

Voltage Efficiency (%)=Average Discharge Voltage (V)/Average Charge Voltage (V)×100

Battery Efficiency (%)=Current Efficiency (%)×Voltage Efficiency (%)×0.01

TABLE 1

| Sample No. | Inclination Angle (°) | Cell Resistivity ($\Omega \cdot cm^2$/cell) | Battery Efficiency (%) |
|---|---|---|---|
| 100 | 0 | 0.45 | 83.72 |
| 1 | 1 | 0.39 | 85.47 |
| 2 | 3 | 0.39 | 85.75 |
| 3 | 10 | 0.39 | 85.71 |
| 4 | 20 | 0.37 | 86.49 |
| 5 | 23 | 0.38 | 84.49 |
| 6 | 30 | 0.39 | 84.93 |
| 7 | 40 | 0.46 | 84.52 |

In the graph shown in FIG. 6, the horizontal axis represents the inclination angle (°), the left vertical axis represents the cell resistivity ($\Omega \cdot cm^2$/cell), and the right vertical axis represents the battery efficiency (%). Samples Nos. 1 to 7 are the RF batteries including the rectangular bipolar plates having the inclined grooves that non-orthogonally intersect the long and short sides of the bipolar plates. Sample No. 100 is the RF battery including the rectangular bipolar plates having the vertical grooves that extend parallel to the long sides of the bipolar plates and orthogonal to the short sides of the bipolar plates. This configuration is similar to the vertical groove configuration according to the related art.

FIG. 6 and Table 1 show that the RF batteries of Samples Nos. 1 to 7 including the above-described inclined grooves have cell resistances less than that of the RF battery of Sample No. 100 including the vertical grooves. As a result of the test, it has been found that the cell resistance can be reduced when the inclination angle θ of the inclined grooves is 1° or more. When the inclination angle θ is greater, in particular, 3° or more, 10° or more, or more than 10°, the cell resistance can be more easily reduced. Also, when the inclination angle θ is 40° or less, in particular, less than 40°, or 35° or less, the cell resistance can be more easily reduced.

FIG. 6 and Table 1 also show that the RF batteries of Nos. 1 to 7 have battery efficiencies higher than that of the RF battery of Sample No. 100 including the vertical grooves. As a result of the test, it has been found that the battery efficiency can be increased when the inclination angle θ is 1° or more. When the inclination angle θ is greater, in particular, 3° or more, 10° or more, or more than 10°, the battery efficiency can be more easily increased. When the inclination angle θ is 40° or less, the battery efficiency tends to be high. Therefore, the inclination angle θ of the inclined grooves is preferably 1° or more and less than 40° in terms of cell resistance and battery efficiency.

Although the above-described results were obtained for single-cell batteries, the cell resistivity and the battery efficiency both had similar tendencies for multi-cell batteries. Thus, it has been confirmed that single-cell batteries and multi-cell batteries including the bipolar plates having the above-described specific inclined grooves have lower cell resistances and higher battery efficiencies than those of batteries having the vertical groove configuration according to the related art.

Modifications

At least one of the modifications described below may be applied to the bipolar plate 2 according to the embodiment, the RF battery 10 according to the embodiment, or the cell stack 30 according to the embodiment.

(1) The shape of the bipolar plate 2 in plan view may be changed. The shape in plan view may be, for example, a shape including a curve on at least a portion of the peripheral edge of the bipolar plate 2, such as an elliptical shape or a race-track shape, or a polygonal shape, such as a hexagonal shape or an octagonal shape.

In this case, a large number of inclined grooves tend to be arranged such that inlets and outlets at the ends thereof are separated from an introduction portion (supply edge) of the peripheral edge of the bipolar plate 2 at which the electrolyte is introduced and a discharge portion (discharge edge) of the peripheral edge of the bipolar plate 2 that opposes the introduction portion and at which the electrolyte is discharged. Accordingly, the distributing groove 214 and the collecting groove 224 that open at the peripheral edge of the bipolar plate 2 may be provided at appropriate positions along the peripheral edge.

(2) The shape of the inclined grooves in plan view may be changed. For example, each inclined groove may have a groove width W that locally varies so that the inclined groove includes thin and thick portions, or have, for example, a snaking shape, such as a wavy shape or a zigzag shape. In this case, the peripheral edge of the groove in plan view is outlined, and a quadrangle including the peripheral edge is drawn. The groove is regarded as an inclined groove when the quadrangle is a parallelogram and the opposing two sides of the quadrangle non-orthogonally intersect the long and short sides of the above-described imaginary rectangle.

Alternatively, each inclined groove may be tapered such that the groove width W thereof decreases from one end (inlet 215 or outlet 225) toward the other end.

(3) The cross sectional shape of the inclined grooves may be changed. The cross sectional shape may be, for example, a semicircular shape, a V-shape, a U-shape, or a dovetail shape in which the width of the opening of the groove is less than the width of the bottom surface.

(4) In the case where a plurality of inclined grooves are provided, the inclined grooves may have, for example, different shapes in plan view or in cross section, different sizes (inclination angles θ, groove widths W, groove depths, etc.), or groove depths that locally vary. Alternatively, the inclined grooves may be arranged such that the distance C therebetween locally varies.

(5) Vertical grooves that are parallel to the side edges 204 may be provided in addition to the inclined grooves.

(6) The configuration may be such that no interdigitating region in which the inclined grooves at the introduction side and the inclined grooves at the discharge side are alternately arranged is provided. For example, a group including a plurality of inclined grooves at the introduction side and a group including a plurality of inclined grooves at the discharge side may be alternately arranged. Alternatively, a group including a plurality of inclined grooves at the introduction side and a group including a plurality of inclined grooves at the discharge side may be arranged next to each other.

(7) Each inclined groove may be formed of a group including a plurality of grooves arranged with gaps therebetween instead of a continuous groove.

For example, the interdigitating grooves 210 and 220 may each be formed of a group including a plurality of groove pieces arranged in the inclination direction with gaps therebetween. In this case, when the electrode on the bipolar plate 2 receives the electrolyte in groove-facing regions corresponding to the groove pieces, regions surrounding the groove-facing regions may be used as the reaction regions. Therefore, the reaction regions can be increased, and high battery reactivity can be expected. When an imaginary extension line that extends at the inclination angle θ is drawn through a groove piece that opens at the supply edge 200 or the distributing groove 214 or that is near the supply edge 200 or the distributing groove 214, the grooves arranged on the extension line may be regarded as belonging to a group of grooves that form a single inclined groove at the introduction side. In addition, when an imaginary extension line that extends at the inclination angle θ is drawn through a groove piece that opens at the discharge edge 202 or the collecting groove 224 or that is near the discharge edge 202 or the collecting groove 224, the grooves arranged on the extension line may be regarded as belonging to a group of grooves that form a single inclined groove at the discharge side.

The present invention is not limited to the above-described examples, but is defined by the scope of the claims. The present invention is intended to include equivalents to the scope of the claims and all modifications within the scope.

REFERENCE SIGNS LIST 2, 2A, 2B bipolar plate
20 flow passage
21 introduction path
22 discharge path
24 interdigitating region
200 supply edge
202 discharge edge
204 side edge
210, 220 interdigitating groove (inclined groove)
212, 222 separate groove (inclined groove)
214 distributing groove
215 inlet
224 collecting groove
225 outlet
10 redox flow battery (RF battery)
10C battery cell
11 membrane
14 positive electrode
15 negative electrode
16 positive electrolyte tank
17 negative electrolyte tank
160, 170 pump
162, 164, 172, 174 pipe
12 cell frame
120 frame body
124$i$, 125$i$ electrolyte inlet
124$o$, 125$o$ electrolyte outlet
30 cell stack
30S sub-cell stack
32 end plate
34 connecting member
400 alternating current/direct current converter
410 transformer facility
420 power generator
440 load

The invention claimed is:

1. A bipolar plate arranged to face an electrode, the bipolar plate comprising:
   a flow passage that is provided on at least one of front and back surfaces of the bipolar plate and along which electrolyte is circulated,
   wherein the flow passage provided on the at least one of the front and back surfaces of the bipolar plate includes
   an introduction path along which the electrolyte is introduced and a discharge path that does not communicate with and is independent of the introduction path and along which the electrolyte is discharged,
   wherein at least one of the introduction path and the discharge path includes an inclined groove that non-orthogonally intersects a long side and a short side of an imaginary rectangle that includes an outer edge of the bipolar plate, and
   wherein the inclined groove is continuous.

2. The bipolar plate according to claim 1, wherein the flow passage provided on the at least one of the front and back surfaces includes at least one pair of inclined grooves that are arranged next to each other, the pair of inclined grooves including the inclined groove included in the introduction path and the inclined groove included in the discharge path.

3. The bipolar plate according to claim 2, wherein the flow passage provided on the at least one of the front and back surfaces is configured such that the introduction path and the discharge path each include a plurality of the inclined grooves, and includes an interdigitating region in which the inclined grooves included in the introduction path and the inclined grooves included in the discharge path are arranged to interdigitate with each other.

4. The bipolar plate according to claim 1, wherein one end of the inclined groove opens at a peripheral edge of the bipolar plate.

5. The bipolar plate according to claim 1, wherein the introduction path includes
   a distributing groove that opens along a peripheral edge of the bipolar plate, the distributing groove being connected to one end of the inclined groove included in the introduction path and supplying the electrolyte to the inclined groove, and
   wherein the discharge path includes
   a collecting groove that opens along the peripheral edge of the bipolar plate at a side opposite to a side at which the distributing groove is provided, the collecting groove being connected to one end of the inclined groove included in the discharge path and collectively discharging the electrolyte from the inclined groove.

6. The bipolar plate according to claim 1, wherein one end and another end of the inclined groove are shifted from each other by a distance greater than or equal to a groove width of the inclined groove.

7. The bipolar plate according to claim 1, wherein the inclined groove has an inclination angle of 1° or more.

8. The bipolar plate according to claim 1, wherein the inclined groove has an inclination angle of 40° or less.

9. A cell stack comprising: the bipolar plate according to claim 1.

10. The cell stack according to claim 9, comprising: a battery cell including a pair of bipolar plates which each include the inclined groove on at least one of the front and back surfaces, wherein the pair of bipolar plates are arranged such that the inclined groove provided on a surface of one of the bipolar plates that faces a positive electrode and the inclined groove provided on a surface of another one of the bipolar plates that faces a negative electrode intersect.

11. A redox flow battery comprising: the cell stack according to claim 9.

12. A bipolar plate arranged to face an electrode, the bipolar plate comprising:

a flow passage that is provided on each of front and back surfaces of the bipolar plate and along which electrolyte is circulated, wherein the flow passage provided on at least one of the front and back surfaces of the bipolar plate includes an introduction path along which the electrolyte is introduced and a discharge path that does not communicate with and is independent of the introduction path and along which the electrolyte is discharged, wherein at least one of the introduction path and the discharge path includes an inclined groove that non-orthogonally intersects a long side and a short side of an imaginary rectangle that includes an outer edge of the bipolar plate, wherein the bipolar plate includes a pair of grooves arranged to intersect in a see-through plan view of the front and back surfaces of the bipolar plate, the pair of grooves including the inclined groove provided on one surface of the bipolar plate and a groove that forms the flow passage on another surface of the bipolar plate, and wherein the inclined groove is continuous.

13. The bipolar plate according to claim 12, wherein the flow passage provided on the at least one of the front and back surfaces includes at least one pair of inclined grooves that are arranged next to each other, the pair of inclined grooves including the inclined groove included in the introduction path and the inclined groove included in the discharge path.

14. The bipolar plate according to claim 13, wherein the flow passage provided on the at least one of the front and back surfaces is configured such that the introduction path and the discharge path each include a plurality of the inclined grooves, and includes an interdigitating region in which the inclined grooves included in the introduction path and the inclined grooves included in the discharge path are arranged to interdigitate with each other.

15. The bipolar plate according to claim 12, wherein one end of the inclined groove opens at a peripheral edge of the bipolar plate.

16. The bipolar plate according to claim 12, wherein the introduction path includes a distributing groove that opens along a peripheral edge of the bipolar plate, the distributing groove being connected to one end of each of a plurality of the inclined grooves included in the introduction path and supplying the electrolyte to each of the inclined grooves, and wherein the discharge path includes a collecting groove that opens along the peripheral edge of the bipolar plate at a side opposite to a side at which the distributing groove is provided, the collecting groove being connected to one end of each of a plurality of the inclined grooves included in the discharge path and collectively discharging the electrolyte from the inclined grooves.

17. The bipolar plate according to claim 12, wherein one end and another end of the inclined groove are shifted from each other by a distance greater than or equal to a groove width of the inclined groove.

18. The bipolar plate according to claim 12, wherein the inclined groove has an inclination angle of 1° or more.

19. The bipolar plate according to claim 12, wherein the inclined groove has an inclination angle of 40° or less.

20. A cell stack comprising:

the bipolar plate according to claim 12.

21. The cell stack according to claim 20, comprising:

a battery cell including a pair of bipolar plates which each include the inclined groove on at least one of the front and back surfaces, wherein the pair of bipolar plates are arranged such that the inclined groove provided on a surface of one of the bipolar plates that faces a positive electrode and the inclined groove provided on a surface of another one of the bipolar plates that faces a negative electrode intersect.

22. A redox flow battery comprising:

the cell stack according to claim 20.

* * * * *